United States Patent [19]

Thöny

[11] Patent Number: 5,052,761
[45] Date of Patent: Oct. 1, 1991

[54] LOAD-DEPENDENT BRAKE VALVE FOR CONTROLLING THE BRAKE LINE PRESSURE OF COMPRESSED AIR BRAKES OF A VEHICLE

[75] Inventor: Riet Thöny, Glattbrugg, Switzerland

[73] Assignee: Werkzeugmaschinenfabrik Oerlikon-Buhrle AG, Zurich, Switzerland

[21] Appl. No.: 520,068

[22] Filed: May 7, 1990

[30] Foreign Application Priority Data

May 31, 1989 [CH] Switzerland ............ 02039/89-6

[51] Int. Cl.$^5$ ............................................. B60T 8/18
[52] U.S. Cl. .............................. 303/22.6; 188/195
[58] Field of Search ............... 303/22.1, 22.2, 22.3, 303/22.5, 22.6, 22.7, 22.8; 188/195

[56] References Cited

U.S. PATENT DOCUMENTS

| | | | |
|---|---|---|---|
| 775,313 | 11/1904 | Schlacks | 188/195 X |
| 2,096,487 | 10/1937 | Farmer | 188/195 |
| 2,173,928 | 9/1939 | Borde et al. | 303/22.6 |
| 2,179,399 | 11/1939 | Browall | 303/22.2 X |
| 2,845,149 | 7/1958 | Stern et al. | 303/22.1 X |
| 3,338,639 | 8/1967 | Carothers | 303/22.2 |
| 4,143,923 | 3/1979 | King | 303/22.6 |

FOREIGN PATENT DOCUMENTS

| | | |
|---|---|---|
| 0072331 | 2/1983 | European Pat. Off. |
| 0275845 | 7/1988 | European Pat. Off. |
| 1455300 | 3/1969 | Fed. Rep. of Germany |
| 57-175452 | 10/1982 | Japan |
| 59-67149 | 4/1984 | Japan |
| 594520 | 1/1978 | Switzerland |
| 2017243 | 10/1979 | United Kingdom |
| 2022206 | 12/1979 | United Kingdom |

Primary Examiner—Matthew C. Graham
Assistant Examiner—Peter M. Poon
Attorney, Agent, or Firm—Sandler, Greenblum & Bernstein

[57] ABSTRACT

In load-dependent brake valves it is customary to control the brake force as a function of the stroke of vehicular suspension springs. If the stroke of the vehicular suspension springs is not proportional to the vehicle load, there is the risk that either the empty vehicle or the full vehicle is too strongly braked. This can be avoided in that a pivotable brake lever is pivotable as a function of the stroke of the vehicular suspension springs, the pivotable brake lever comprising a first pivoting range in which a first edge of a piston of the load-dependent brake valve is supported and a second pivoting range in which a second edge of the aforesaid piston is supported. It is thereby achieved that the brake force is always proportional to the vehicle load.

3 Claims, 2 Drawing Sheets

FIG. 1
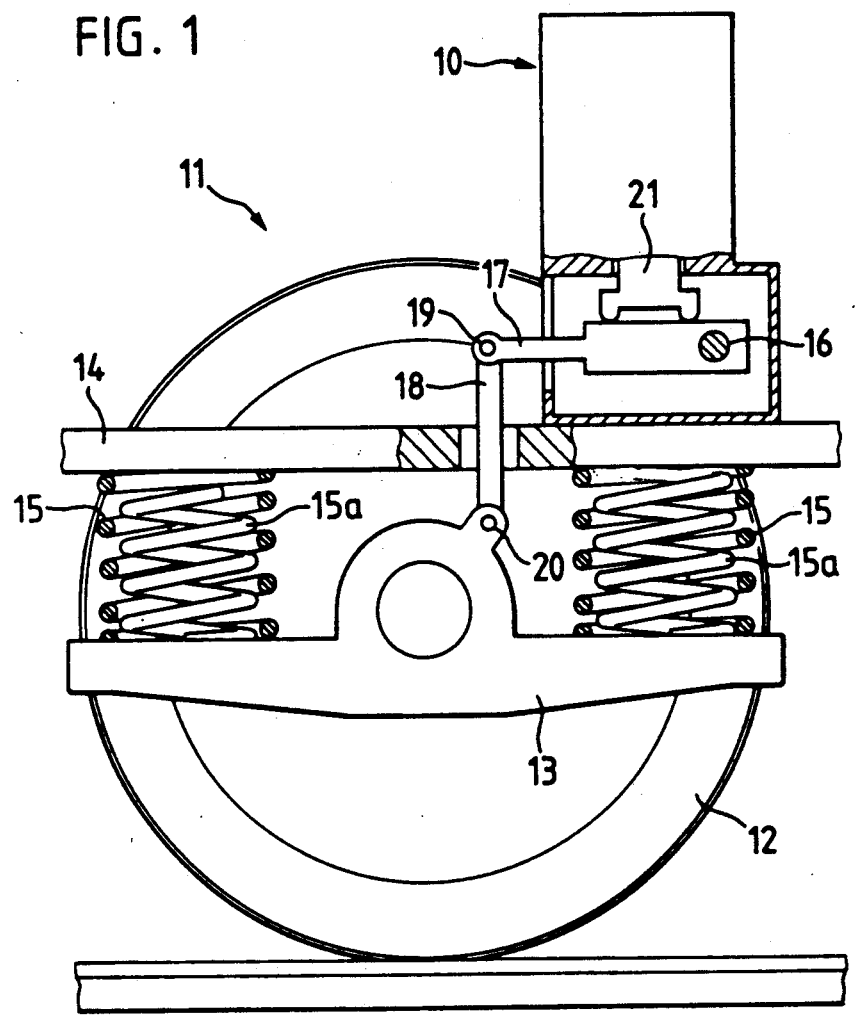
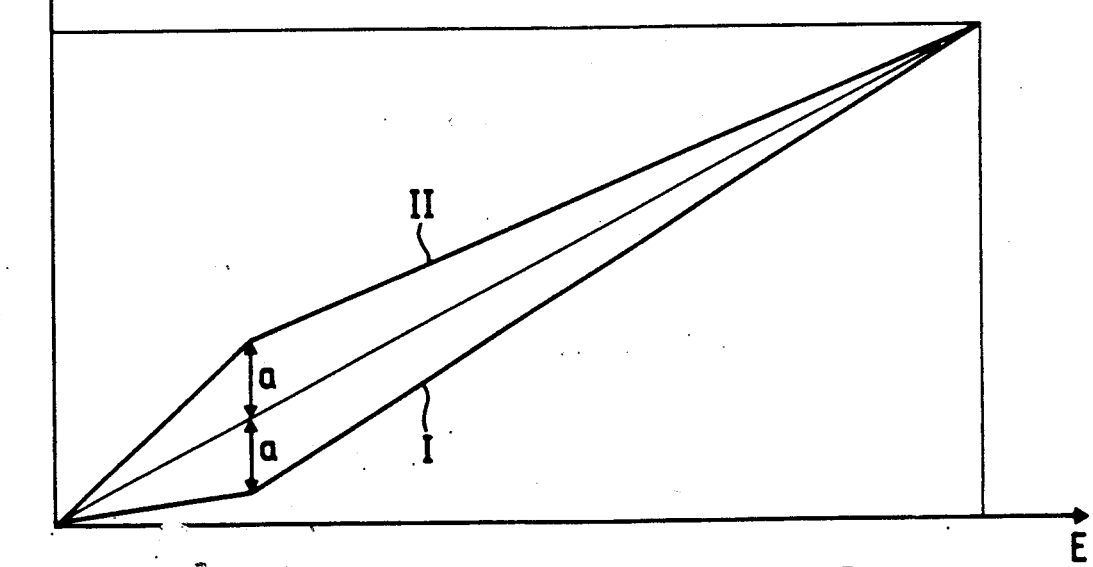
FIG. 3

LOAD-DEPENDENT BRAKE VALVE FOR CONTROLLING THE BRAKE LINE PRESSURE OF COMPRESSED AIR BRAKES OF A VEHICLE

BACKGROUND OF THE INVENTION

The present invention broadly relates to brake-force regulators for motor vehicles and pertains, more specifically, to a new and improved load-dependent brake valve for controlling the brake-line pressure of compressed-air brakes of a vehicle.

Generally speaking, the load-dependent brake valve controlling the brake-line pressure of vehicular compressed-air brakes and comprising vehicular suspension springs coupled to the load-dependent brake valve, the vehicular suspension springs being subject to a stroke dependent upon the vehicle load or loading, a pivotable brake lever which is pivotable in a predetermined pivoting range as a function of the stroke of the vehicular suspension springs, valve and bearing upon the pivotable brake lever.

that the stroke of the vehicular suspension springs is substantially proportional to the vehicle load or loading. If this is not the case, there is then the risk that either the empty or no-load vehicle or the full or fully-laden vehicle is too strongly braked or, in other words, either the empty or no-load vehicle or the full or fully-laden vehicle is insufficiently or unsatisfactorily braked. Reference in this connection is made, for example, to British Patent No. 2,022,206, published Dec. 12, 1979 of Automotive Products Limited and Swiss Patent No. Assignee, Werkzeugmaschinenfabrik Oerlikon-Bührle AG. In the prior art brake valves described in these two patents, the stroke of the vehicular suspension springs is taken into However, it is thereby taken for granted that the stroke of the vehicular suspension springs is substantially linear, i.e. proportional to the vehicle load or loading, the aforementioned disadvantages then resulting therefrom.

SUMMARY OF THE INVENTION

Therefore, with the foregoing in mind, it is a primary object of the present invention to provide a new and improved construction of load-dependent brake valve which does not suffer from the aforementioned drawbacks and shortcomings of the prior art.

Another and more specific object of the present invention aims at providing a new and improved load-dependent brake valve of the initially mentioned type and in which the braking or brake force is exactly proportional to the load or loading of the vehicle and thus not proportional to the stroke of the vehicular suspension springs, although the load-dependent brake valve is actuated as a function of the stroke of the vehicular suspension springs.

Yet a further significant object of the present invention aims at providing a new and improved load-dependent brake valve which is relatively simple in construction and design, is composed of less individual elements than prior art constructions, can be economically feasibly manufactured in accordance with conventional techniques, is highly reliable in operation and not readily subject to malfunction Now in order to implement these and still further objects of the present invention which will become more readily apparent as the description proceeds, the load-dependent brake valve for controlling the brake-line pressure of compressed-air brakes of a vehicle is manifested, among other things, by the features that the piston comprises at least two supporting edges or cams and that the predetermined pivoting range of the pivotable brake lever is subdivided into a first pivoting range and a second pivoting range, the pivotable brake lever in the first pivoting range bearing upon one of the at least two supporting edges or cams, and the pivotable brake lever in the second pivoting range bearing upon the other one of the at least two supporting edges or cams.

The pivotable brake lever advantageously comprises a central or intermediate position located between the first pivoting range and the second pivoting range, both supporting edges or cams of the piston bearing upon the pivotable brake lever in this central or intermediate position thereof.

The pivotable brake lever is pivotable about a stationary axle, whereby the spacing between the stationary axle and the point of support of one supporting edge or cam is smaller than the spacing between the stationary axle and the point of support of the other supporting edge or cam.

BRIEF DESCRIPTION OF THE DRAWINGS

The invention will be better understood and objects other than those set forth, above will become apparent when consideration is given to the following detailed description thereof. Such description makes reference to the annexed drawings wherein throughout the various figures of the drawings, there have been generally used the same reference characters to denote the same or analogous components and wherein:

FIG. 1 shows in a side view a load-dependent brake valve seen in the direction of an axle of a vehicle chassis and constructed according to the invention;

FIG. 3 is a diagram showing, on the one hand, the stroke of vehicular suspension springs as a function of vehicle load and, on the other hand, the brake force as a function of the stroke of vehicular suspension springs.

DETAILED DESCRIPTION OF THE PREFERRED EMBODIMENTS

Figure 2:
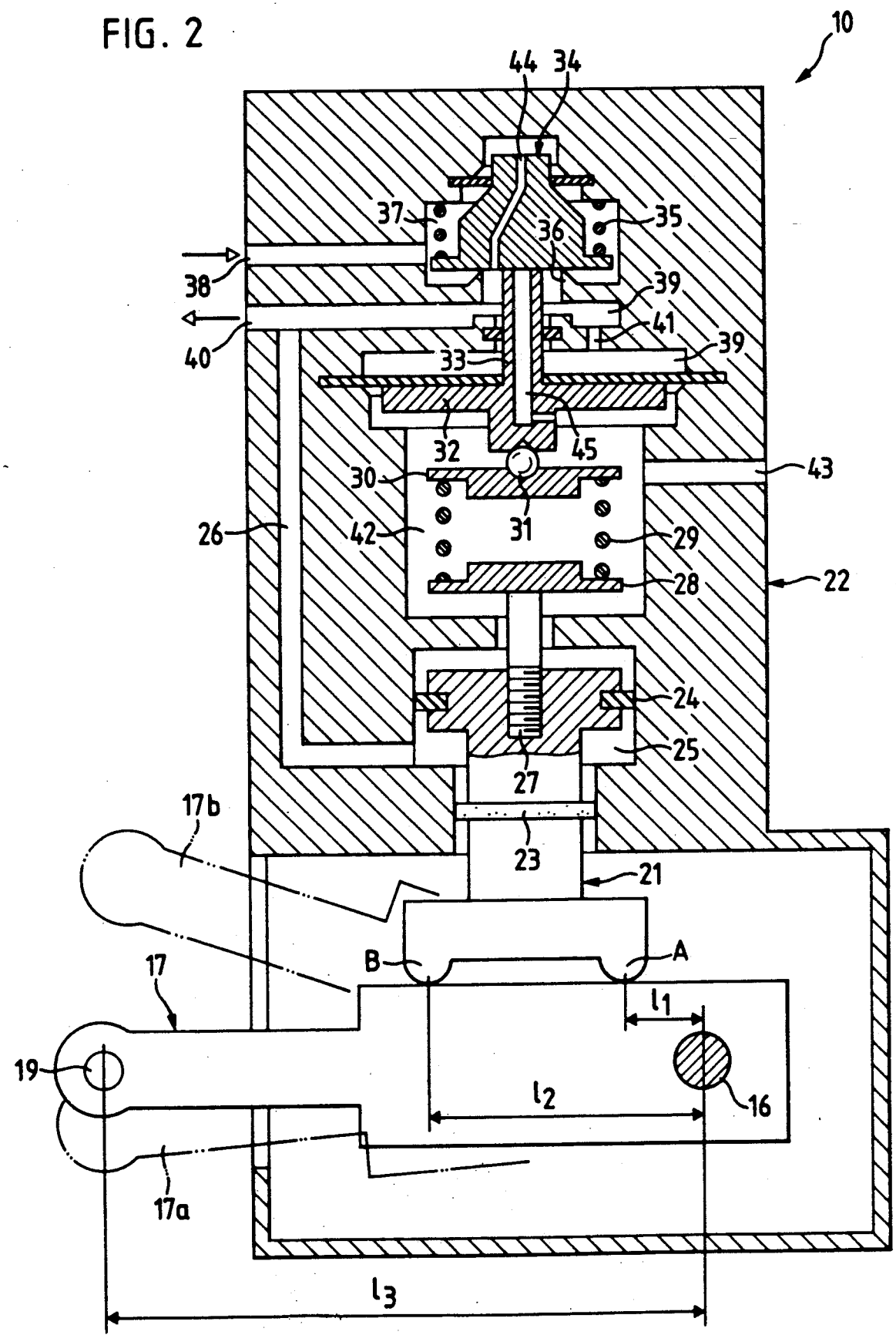
FIG. 2 is a longitudinal sectional view of the load-dependent brake valve illustrated in FIG. 1, taken substantially through the center line of the load-dependent brake valve.

Describing now the drawings, it is to be understood that to simplify the showing thereof, only enough of the construction of the exemplary embodiment of the load-dependent brake valve has been illustrated therein as is needed to enable one skilled in the art to readily understand the underlying principles and concepts of this invention.

Turning attention now specifically to FIG. 1 of the drawings, a load-dependent brake valve 10 schematically illustrated therein by way of example and not limitation will be seen to be located on a vehicle 11 of which essentially only a part of a chassis or undercarriage is indicated. A wheel 12 of the chassis or undercarriage is rotatably mounted at a beam or bar 13. A loading bridge or platform 14 bears upon this beam or bar 13 by means of two strong vehicular suspension springs 15 each comprising an arrangement of two concentric or coaxial coil spring elements of different coil length.

The load-dependent brake valve 10, also known as a "rocker" valve, is mounted at the loading bridge 14. A pivotable brake lever 17 is fixedly secured to an axle 16 of this load-dependent brake valve 10 and hingedly or pivotably This rod or bar 18 is connected by means of a first hinge or joint 19 to the pivotable brake lever 17 and by means of a Upon loading the vehicle 11, the two strong vehicular suspension springs 15 are compressed and the loading bridge 14 is thereby lowered toward the beam or bar 13 such that the rod or bar 18 is capable of pivoting the pivotable brake lever 17 and thus of rotating the axle 16 of the load-dependent brake valve 10.

It is apparent from FIG. 1 that, upon loading the vehicle 11, the pivotable brake lever 17 is pivoted in the clockwise direction of rotation and that, if the load of the vehicle 11 reduces, this pivotable brake lever 17 will be pivoted in the counter-clockwise direction. In this manner, the braking or brake force can be controlled as a function of the vehicle load or loading. If the spring characteristic of the two strong vehicular springs 15 is not substantially linear, it is then necessary that the construction of the load-dependent brake valve 10 takes this into account as described hereinbelow in conjunction with FIG. 2.

According to FIG. 2, the pivotable brake lever 17 is shown in its substantially horizontal position indicated or outlined in full lines, such substantially horizontal 11 is totally unloaded, the pivotable brake lever 17 will move downwardly into its lowermost position designated by reference numeral 17a and indicated in dash-and-dot lines. In case the vehicle 11 is totally loaded, the pivotable brake lever 17 moves upwardly and assumes its uppermost position designated by reference numeral 17b and likewise indicated in dash-and-dot lines.

At this pivotable brake lever 17 there is supported a piston 21 which is displaceably mounted or guided in a housing 22 of the load-dependent brake valve 10. This piston 21 comprises two edges or cams A and B. In the depicted substantially horizontal position of the pivotable brake lever 17, both edges or cams A and B bear upon this pivotable brake lever 17. If the pivotable brake lever 17 is pivoted in counter-clockwise direction with the axle 16, which is secured thereat and mounted in the housing 22, when the vehicle 11 is loaded to a lesser extent, then only the edge or cam A of the piston 21 can bear against the pivotable brake lever 17. There thus results a first transmission ratio or mechanical advantage $l_1$ to $l_3$ between a small lever arm $l_1$ and a large lever arm $l_3$. On the other hand, if upon loading the vehicle 11 the pivotable brake lever 17 with the axle 16 secured thereat is pivoted in clockwise direction, then only the edge or cam B of the piston 21 can bear upon the pivotable brake lever 17, this resulting in a second transmission ratio or mechanical advantage $l_2$ to $l_3$ between a smaller lever arm $l_2$ and the larger lever arm $l_3$.

As hereinbefore mentioned, the piston 21 is displaceably guided in the housing 22 and comprises a small lower sealing or packing ring 23 and a large upper sealing or packing ring 24. These two sealing or packing rings 23 and 24 delimit or bound a relief chamber 25, into which compressed air is fed from a line or conduit 26. Since the two sealing or packing rings 23 and 24 are not of the same size, the compressed air in the relief chamber 25 tends to upwardly press the piston 21 and, in other words, to relieve the pivotable brake lever 17.

A first plate 28 is mounted at the piston 21 by means of a rod or bar 27. A spring 29 bears upon this first ball 31, bears upon a diaphragm piston 32. This diaphragm piston 32 is mounted at a plunger or push rod 33 serving to actuate or engage a valve head or disc 34. The plunger or push rod 33 is provided with a bore or borehole 45 which connects a chamber 39 with a chamber 42. The valve head or disc 34 is urged into sealing engagement with a valve seat 36 by a compression spring 35.

The valve head or disc 34 separates a first chamber 37 connected to a feed line or conduit 38 from the connected to a control line or conduit 40. The aforenoted line or conduit 26 for compressed air is also connected to this control line or conduit 40, such line or conduit 26 leading to the aforenoted relief chamber 25. The second chamber 39 comprises two parts which are connected with each other by a throttle opening or bore 41. Below the diaphragm piston 32 there is located the aforementioned chamber 42 constituting a third chamber which is connected to atmosphere via a vent line or conduit 43. A bore or bore-hole 44 in the valve head or disc 34 serves, in known manner, for relieving the valve head or disc 34.

Having now had the benefit of the detailed description of the construction of the load-dependent brake valve 10 constructed according to the invention, the mode of considered in conjunction with FIGS. 2 and 3 and is as follows:

It is assumed that a pressure of, for example, 8 atmospheres above atmospheric pressure prevails in the feed chamber 39 tends to downwardly press the diaphragm piston 32, and the spring 29 is urged to upwardly press the diaphragm piston 32 by acting on the second plate 30 and the ball 31.

A balance or equilibrium must prevail between the pressure in the second chamber 39 and the force of the spring 29 located in the third chamber 42. If the force or bias of the spring 29 is greater than the downwardly directed force exerted by the pressure prevailing in the second chamber 39, the diaphragm piston 32 is lifted and the plunger or push rod 33 thereby presses the valve head or disc 34 upwardly and lifts the latter away from the valve seat 36, so that compressed air from the feed line or conduit 38 can stream through the first chamber 37 into the second chamber 39. In this manner, the pressure in the second chamber 39 is raised until the force downwardly exerted on the diaphragm piston 32 is equal to the force exerted by the spring 29. The valve head or disc 34 is again urged into sealing engagement with the valve seat 36 and the pressure in the second chamber 39 can no longer increase.

If the spring 29 located in the third chamber 42 is compressed or expanded by raising or lowering the pivotable brake lever 17, the pressure prevailing in the second chamber 39 will correspondingly increase or decrease until the valve head or disc 34 is allowed to reseat and engage the valve seat 36.

To lower or reduce the pressure in the second chamber 39, the plunger or push rod 33 is moved away from the valve head or disc 34 by the pressure prevailing in the second chamber 39, until this pressure prevailing in the second chamber 39 is sufficiently reduced by the bore or bore-hole 45 located in the plunger or push rod 33, the third chamber 42 and the vent line or conduit 43, so that the spring 29 is again capable of pressing the plunger or push rod 33 against the valve head or disc 34.

It is thereby worthy of note that the control pressure in the second chamber 39 is solely dependent on the position of the pivotable brake lever 17. The load-dependent brake valve 10 is thus solely dependent on the position of the pivotable brake lever 17 and, therefore, is also known as a path-dependent rocker valve. Such path is thereby dependent on whether the edge or cam A or the edge or cam B of the piston 21 bears upon the pivotable brake lever 17. It is apparent from FIGS. 1 and 2 that in the case of equal pivoting angles of the pivotable brake lever 17, the piston the edge or cam A bears upon the pivotable brake lever 17, but that the elevational stroke becomes larger as soon as the The diagram illustrated in FIG. 3 serves to better understand the mode of operation of the load-dependent brake valve 10 constructed according to the invention. On the one hand, there is shown the stroke E of the two strong vehicular suspension springs 15 as a function of the vehicle load or loading G and, on the other hand, there is shown the braking or brake force P as a function of the stroke E of the two strong vehicular suspension springs 15.

A characteristic I shows the stroke E of the two strong vehicular suspension springs 15 as a function of the vehicle load or loading G. As heretofore explained there are provided two arrangements of two concentrically or coaxially arranged coil spring elements of different coil length. At the outset, i.e. when the vehicle 11 is practically empty, only one spring element of each concentric spring arrangement is active or effective. With increasing vehicle load or loading both concentrically arranged spring elements of both spring arrangements are active or effective. For this reason, the characteristic I of the springs possesses a "knee" as shown in FIG. 3.

A characteristic II shows the braking or brake force P as a function of the stroke of the two strong vehicular suspension springs 15. At the outset, the with increasing vehicle load or loading G, this pivotable brake lever 17 acts upon the edge or cam B of the piston 21. brake force P likewise possesses a "knee" point as shown in FIG. 3.

The resulting characteristic of these two characteristics I and II is essentially a straight line, i.e. the braking or brake force P is proportional to the vehicle load or loading G. There is thus achieved by the arrangement of the two edges or cams A and B at the piston 21 that the braking or brake force P linearly increases relative to the vehicle load or loading G.

While there are shown and described present preferred embodiments of the invention, it is to be distinctly understood that the invention is not limited thereto, but may be otherwise variously embodied and practiced within the scope of the following claims. ACCORDINGLY,

What I claim is:

1. A load-dependent brake valve for controlling the brake-line pressure of vehicular compressed-air brakes, comprising:
   vehicular suspension springs coupled to the load-dependent brake valve;
   said vehicular suspension springs being subject to a stroke dependent upon the vehicle load;
   said vehicle suspension springs each comprising an arrangement of two coaxial coil spring elements of different coil length resulting in a bended spring characteristic; a pivotable brake lever pivotable about a stationary axle and defining a lever arm;
   said pivotable brake lever being pivotable in a predetermined pivoting range as a function of said stroke of said vehicular suspension springs;
   a piston service to actuate the load-dependent brake valve;
   said piston having a bearing surface for bearing upon said pivotable brake lever;
   said piston comprising, on said bearing surface, at least two supporting cams each having a line of support;
   said predetermined pivoting range of said pivotable brake lever being subdivided into a first pivoting range and a second pivoting range;
   said pivotable brake lever in said first pivoting range bearing only upon one of said at least two supporting cams of said piston;
   said pivotable lever in said second pivoting range bearing only upon the other of said at least two supporting cams of said piston;
   said line of support of said one supporting cam at said pivotable brake lever defining with said stationary axle a first arm resulting together with said lever arm in a first transmission ratio;
   said line of support of said other one supporting cam at said pivotable brake lever defining with said stationary axle a second arm resulting together with said lever arm in a second transmission ratio; and
   said two supporting cams being arranged for compensating said bended spring characteristic.

2. A load-dependent brake valve as defined in claim 1, wherein:
   said pivotable brake lever possesses a central position located between said first pivoting range and said second pivoting range; and
   both supporting cams of said at least two supporting cams bearing upon said pivotable brake lever in said central position.

3. The load-dependent brake valve as defined in claim 1 wherein:
   said first arms is smaller than said second arm.

* * * * *